United States Patent
Abraham et al.

(10) Patent No.: US 8,085,884 B2
(45) Date of Patent: *Dec. 27, 2011

(54) METHOD AND APPARATUS FOR PROCESSING SATELLITE POSITIONING SYSTEM SIGNALS TO OBTAIN TIME INFORMATION

(75) Inventors: Charles Abraham, Los Gatos, CA (US); Emre Tapucu, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 12/192,667

(22) Filed: Aug. 15, 2008

(65) Prior Publication Data

US 2008/0304601 A1    Dec. 11, 2008

Related U.S. Application Data

(63) Continuation of application No. 10/774,309, filed on Feb. 6, 2004, now Pat. No. 7,447,253.

(51) Int. Cl.
*H04L 27/06* (2006.01)

(52) U.S. Cl. ...................................... 375/342

(58) Field of Classification Search .......... 375/144–145, 375/148–150, 343; 342/357.01, 357.04, 342/357.12, 358
See application file for complete search history.

(56) References Cited

U.S. PATENT DOCUMENTS

| | | | |
|---|---|---|---|
| 6,104,978 A | 8/2000 | Harrison et al. | |
| 6,300,899 B1 * | 10/2001 | King | 342/357.12 |
| 6,380,891 B1 * | 4/2002 | Yamashita | 342/357.15 |
| 6,970,500 B1 * | 11/2005 | Sanders | 375/150 |
| 2002/0186165 A1 * | 12/2002 | Eschenbach | 342/357.15 |

OTHER PUBLICATIONS

Communication pursuant to Article 94(3) EPC for European Patent Application Serial No. 05726482.2-1248, dated Sep. 25, 2009.

* cited by examiner

*Primary Examiner* — Khanh C Tran

(74) *Attorney, Agent, or Firm* — McAndrews, Held & Malloy, Ltd.

(57) ABSTRACT

A method and apparatus for processing satellite positioning system signals at a mobile receiver is described. In one example, first bit-transitions within satellite navigation data transmitted by at least one satellite are estimated at the mobile receiver. A bit pattern is generated that includes a known preamble and an extended preamble. The extended preamble includes expected data bits within the satellite navigation data. The first bit-transitions are compared with second bit-transitions of the bit pattern to generate match data.

38 Claims, 7 Drawing Sheets

METHOD AND APPARATUS FOR PROCESSING SATELLITE POSITIONING SYSTEM SIGNALS TO OBTAIN TIME INFORMATION

This application claims priority to "Method and Apparatus for Processing Satellite Positioning System Signals to Obtain Time Information", application for U.S. patent Ser. No. 10/774,309 filed Feb. 6, 2004 by Abraham, issued as U.S. Pat. No. 7,447,253, on Nov. 4, 2008, which is incorporated herein by reference in its entirety for all purposes.

BACKGROUND OF THE INVENTION

1. Field of the Invention

The present invention generally relates to satellite position location systems and, more particularly, to a method and apparatus for processing satellite positioning system signals to obtain time information.

2. Description of the Related Art

Global Positioning System (GPS) receivers use measurements from several satellites to compute position. GPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver.

More specifically, each GPS signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges", since they are known modulo the 1 millisecond PN frame boundaries. By resolving the integer number of milliseconds associated with each delay to each satellite, then one has true, unambiguous, pseudoranges. A set of four pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS time" or "time-of-day") associated with the satellite signal. The absolute time information is in the form of a second of the week signal, referred to as time-of-week (TOW). This absolute time signal allows the receiver to unambiguously determine a time tag for when each received signal was transmitted by each satellite.

Notably, FIG. 1 depicts a diagram showing the format of a GPS navigation message. The GPS navigation data message, as defined by ICD-GPS-200C, comprises a sequence of 1500-bit frames broadcast at 50 bits per second ("frames 102"). Each of the frames 102 is transmitted in 30 seconds. Each of the frames 102 includes five sub-frames $104_1$ through $104_5$ (collectively referred to as sub-frames 104). Each of the sub-frames includes 300 bits and is thus transmitted in 6 seconds. The first three sub-frames $104_1$ through $104_3$ include ephemeris and clock correction information associated with a particular broadcasting satellite. Over a particular period of time (e.g., four hours), the first three sub-frames $104_1$ through $104_3$ are identically repeated in each 1500-bit frame 102. The fourth and fifth sub-frames $104_4$ and $104_5$ include part of a satellite almanac, which includes coarse ephemeris and time model information for the entire satellite constellation. The contents of the fourth and fifth sub-frames $104_4$ and $104_5$ change until the entire almanac is transmitted. The repetition period of the fourth and fifth sub-frames $104_4$ and $104_5$ is 12.5 minutes (i.e., the entire satellite almanac is contained in 15,000 bits).

Each of the sub-frames 104 includes ten words of 30 bits in length. Notably, each of the sub-frames 104 includes a telemetry word ("TLM word 106"), a hand-over word ("HOW 108"), and eight data words ("data words 110"). The TLM word 106 includes a preamble 112, a telemetry message ("TLM message 114"), a pair of reserved bits 116, and parity data 118. The preamble 112 includes a known eight-bit sequence defined as "10001011". The TLM message 114 includes telemetry information for military applications and is representing using 14 bits (i.e., bits 9-22 of the TLM word 106). The reserved bits 116 are the $23^{rd}$ and $24^{th}$ bits of the TLM word 16. The parity data 118 includes a Hamming code for the TLM word 106 and is represented using six bits (i.e., bits 25-30).

The HOW 108 includes a TOW-count message 120, an alert flag 122, an anti-spoof flag 124, a sub-frame ID 126, and parity data 128. The TOW-count message 120 includes the number of seconds elapsed since midnight of Jan. 5, 1980, and is represented using 17 bits (i.e., bits 1-17 of the HOW 108). The TOW is synchronized to the beginning of the next sub-frame. The alert flag 122 and the anti-spoof flag 124 are for military applications and are each represented using one bit (i.e., bits 18 and 19). The sub-frame ID 126 includes the number of the current sub-frame and is represented using three bits (i.e., bits 20-22). The parity data 128 includes a Hamming code for the HOW word 108 as well as padding bits and is represented using eight bits (i.e., bits 23-30).

Conventionally, a GPS receiver determines absolute time by decoding and synchronizing the 50 bps navigation data stream. GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

In some GPS applications, the signal strengths of the satellite signals are so low that either the signals cannot be processed, or the time required to process the signals is excessive. Notably, the navigation data stream cannot be reliably decoded and synchronized. As such, the TOW data within the satellite signals cannot be accurately received. Absent another source of accurate time, the remote receiver will not be able to accurately locate its position.

Accordingly, there exists a need in the art for a method and apparatus that processes satellite positioning system signals to obtain time information.

SUMMARY OF THE INVENTION

A method and apparatus for processing satellite positioning system data at a mobile receiver is described. In one embodiment of the invention, first bit-transitions within satellite navigation data transmitted by at least one satellite are estimated at the mobile receiver. A bit pattern is generated that includes a known preamble and an extended preamble. The extended preamble comprises expected data bits within the satellite navigation data. The first bit-transitions are compared with second bit-transitions of the bit pattern to generate match data. In one embodiment, the extended preamble may be formed in response to information associated with parameters of a telemetry word and/or a handover word of the satellite navigation data. The match data may be analyzed to relate timing of the satellite navigation data to receiver timing and to determine a time-of-week value from the satellite navigation data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE INVENTION

A method and apparatus for processing satellite positioning system signals to obtain time information is described. One or more aspects of the invention are described with respect to obtaining time-of-week information (TOW) from global positioning system (GPS) signals. Those skilled in the art will appreciate that the invention may be used to obtain time information from other types of position location systems, such as the GLONASS or GALILEO systems.

Figure 2:
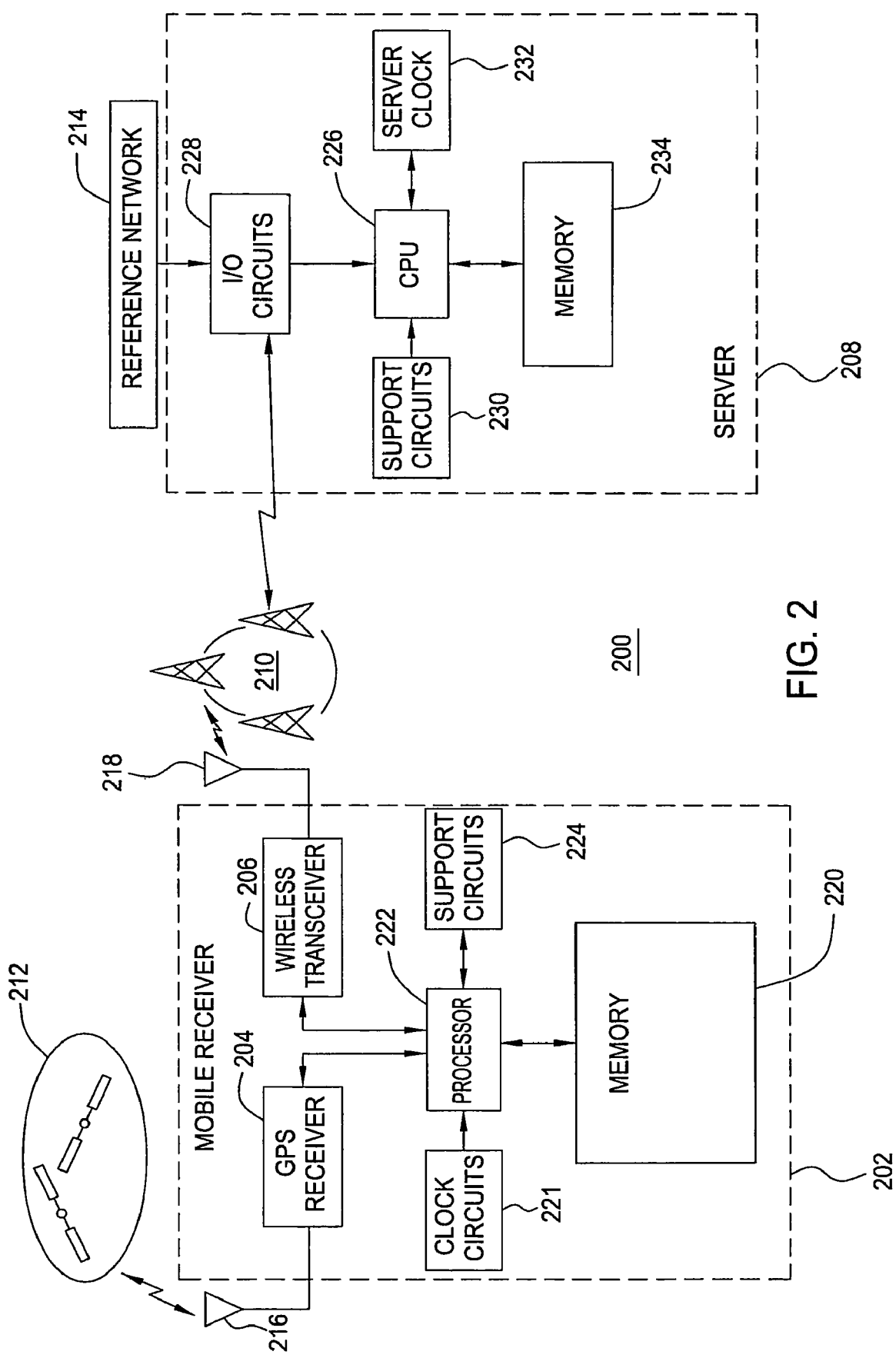
FIG. 2 is a block diagram depicting an exemplary embodiment of a position location system.

FIG. 2 is a block diagram depicting an exemplary embodiment of a position location system 200. The system 200 comprises a mobile receiver 202 in communication with a server 208 via a wireless communication network 210. For example, the server 208 may be disposed in a serving mobile location center (SMLC) of the wireless communication network 210. The mobile receiver 202 obtains satellite measurement data with respect to a plurality of satellites 212 (e.g., pseudoranges, Doppler measurements). The server 208 obtains satellite navigation data for at least the satellites 212 (e.g., orbit trajectory information, such as ephemeris). Position information for the mobile receiver 202 is computed using the satellite measurement data and the satellite navigation data.

In one embodiment, the mobile receiver 202 sends the satellite measurement data to the server 208 along with a time-tag, and the server 208 locates position of the mobile receiver 202 (referred to as the mobile station assisted or "MS-assisted" configuration). In another embodiment, the server 208 sends the satellite navigation data to the mobile receiver 202, and the mobile receiver 202 locates its own position (referred to as the mobile station based or "MS-based" configuration). In both the MS-assisted configuration, and the MS-based configuration, the server 208 may transmit satellite signal acquisition assistance data ("acquisition assistance data"), or other types of assistance data, such as ephemeris data, reference time data, almanac data, and the like, to the mobile receiver 202 upon request. In addition, as described below, the server 208 may transmit information to the mobile receiver 202 to assist in synchronizing to satellite navigation message data broadcast by the satellites 212.

The server 108 illustratively comprises an input/output (I/O) interface 228, a central processing unit (CPU) 226, support circuits 230, a server clock 232, and a memory 234. The CPU 226 is coupled to the memory 234 and the support circuits 230. The memory 234 may be random access memory, read only memory, removable storage, hard disc storage, or any combination of such memory devices. The support circuits 230 include conventional cache, power supplies, clock circuits, data registers, I/O interfaces, and the like to facilitate operation of the server 208. One or more of the processes and methods described herein may be implemented using software 232 stored in the memory 234 for execution by the CPU 226. Alternatively, the server 208 may implement such processes and methods in hardware or a combination of software and hardware, including any number of processors independently executing various programs and dedicated hardware, such as application specific integrated circuits (ASICs), field programmable gate arrays (FPGAs), and the like.

The I/O interface 228 is configured to receive data from the wireless network 210, such as satellite measurement data collected by the mobile receiver 202 or a request for information by the mobile receiver 202. In addition, the I/O interface 228 is configured to receive satellite navigation data, such as ephemeris for at least the satellites 212, from an external source, such as a network of tracking stations ("reference network 214"). The reference network 214 may include several tracking stations that collect satellite navigation data from all the satellites in the constellation, or a few tracking stations, or a single tracking station that only collects satellite navigation data for a particular region of the world.

An exemplary system for collecting and distributing satellite navigation data is described in commonly-assigned U.S. patent application Ser. No. 10/719,890, filed Nov. 21, 2003, which is incorporated by reference herein in its entirety.

The mobile receiver 202 illustratively comprises a GPS receiver 204, a wireless transceiver 206, a processor 222, support circuits 224, a memory 220, and a clock circuit 221. The GPS receiver 204 receives satellite signals from the satellites 212 using an antenna 216. The wireless transceiver 206 receives a wireless signal from the wireless communication network 210 via an antenna 218. The GPS receiver 204 and the wireless transceiver 206 may be controlled by the processor 222. The clock circuit 221 may be used to track time-of-day and may comprise, for example, a real-time clock or a millisecond counter. The clock circuit 221 may be used to provide time-tags for measurements made by the GPS receiver 204. The clock circuit 221 may be calibrated in accordance with a time determination process 300 described below.

The processor 222 may comprise a microprocessor, instruction-set processor (e.g., a microcontroller), or like type processing element known in the art. The processor 222 is coupled to the memory 220 and the support circuits 224. The memory 220 may be random access memory, read only memory, removable storage, hard disc storage, or any combination of such memory devices. The support circuits 224 include conventional cache, power supplies, clock circuits, data registers, I/O interfaces, and the like to facilitate operation of the mobile receiver 202. One or more of the processes and methods described herein may be implemented using software 238 stored in the memory 220 for execution by the processor 222. Alternatively, the mobile receiver 202 may implement such processes and methods in hardware or a combination of software and hardware, including any number of processors independently executing various programs and dedicated hardware, such as ASICs, FPGAs, and the like.

Figure 1:
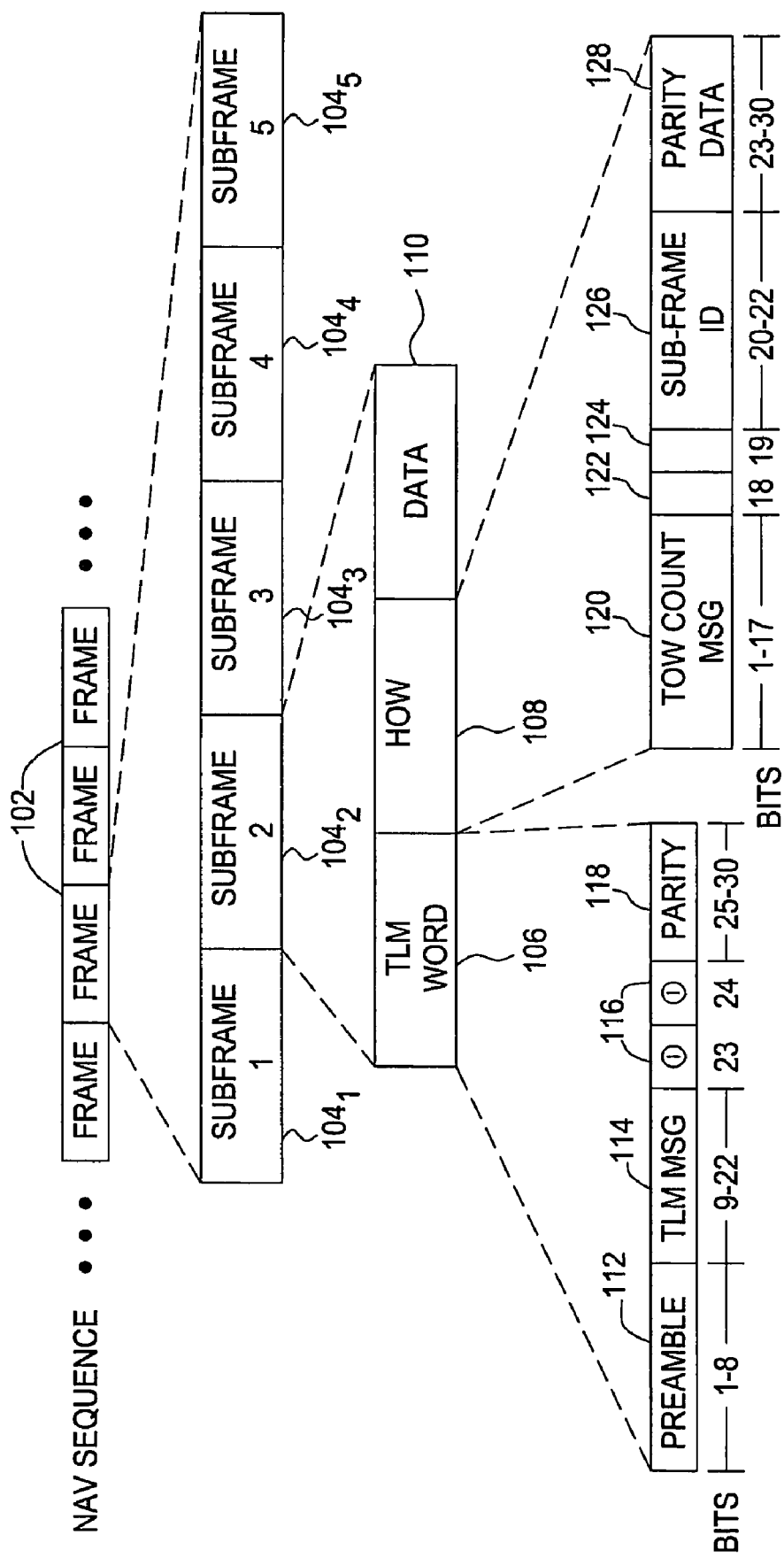
FIG. 1 depicts a diagram showing the format of a GPS navigation message.

The GPS receiver 204 performs two functions. First, the GPS receiver 204 processes the satellite signals to obtain satellite measurement data in a well-known manner (e.g., pseudoranges, Doppler measurements). Second, the GPS receiver 204 processes the satellite signals to estimate satellite navigation data. In one embodiment, the GPS receiver 204 estimates transitions between sequential navigation data bits broadcast by the satellites 212. In GPS, the navigation data broadcast by the satellites is defined in accordance with the GPS navigation message, the format of which is shown in FIG. 1. An exemplary embodiment of the GPS receiver 204 is described below with respect to FIG. 5.

Figure 3:
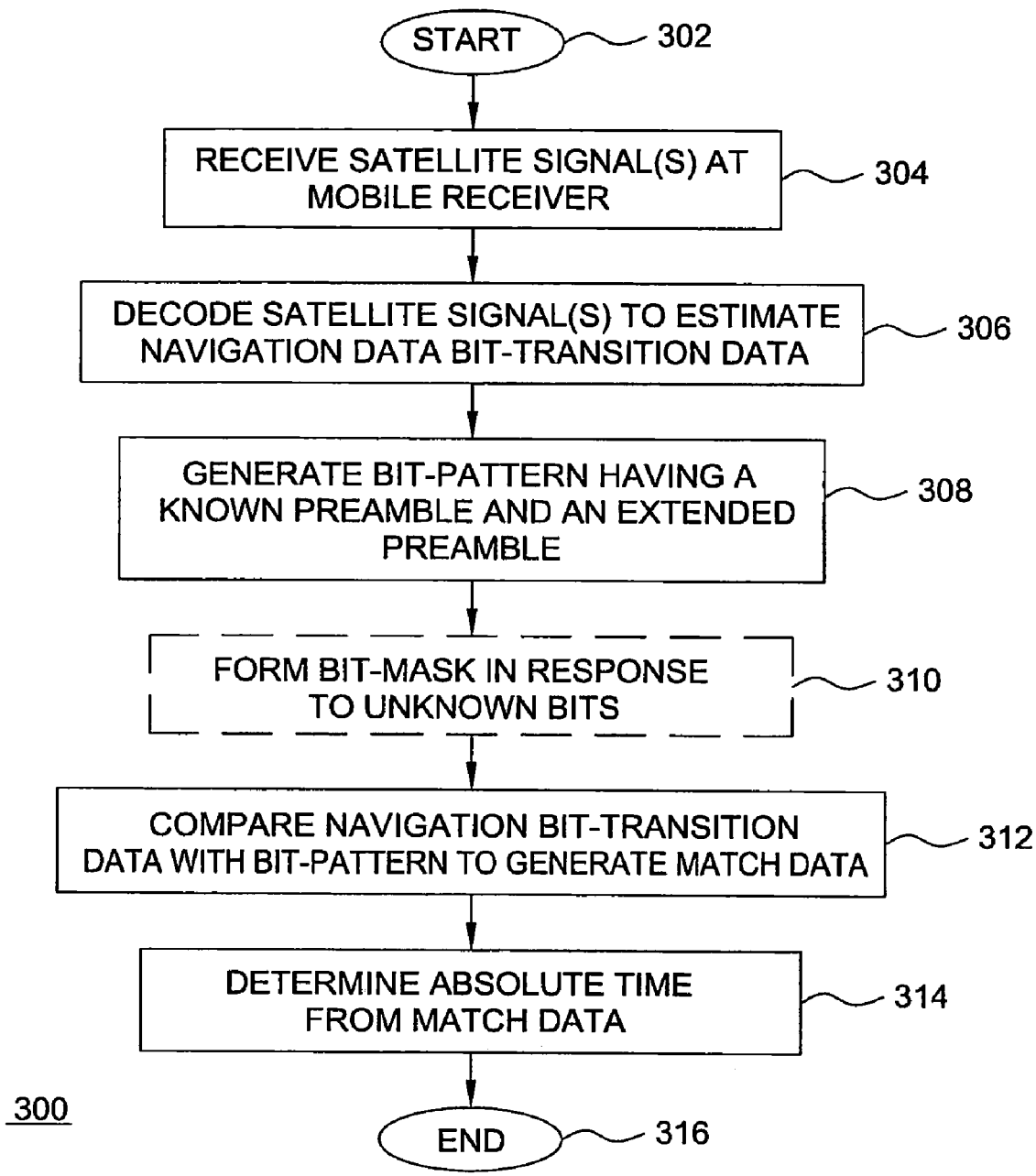
FIG. 3 is a flow diagram depicting an exemplary embodiment of a process for extracting time information from a satellite positioning system signal at a mobile receiver.

FIG. 3 is a flow diagram depicting an exemplary embodiment of a process 300 for determining time from a satellite positioning system signal at a mobile receiver. One or more aspects of the process 300 may be understood with reference to the position location system 100 of FIG. 1. The process 300 begins at step 302. At step 304, one or more satellite signals are received at the mobile receiver 202. As described above, the satellite signals are distinguishable from one another by unique pseudorandom spreading codes. At step 306, a sequence of transitions between navigation data bits is obtained from each of the satellite signals received at step 304 ("navigation data bit transition data"). Notably, the satellite signals are "despread" in that the PN spreading codes are removed by the GPS receiver 204 using a well-known correlation process. The GPS receiver 204 may then detect navigation data bit-transitions within the satellite navigation message carried by each signal. An exemplary embodiment of a process for estimating satellite navigation data bit-transitions is described below.

At step 308, a bit-pattern is generated having a known preamble and an extended preamble. As described below, the bit-pattern is located within the estimated satellite navigation data to determine absolute time. The known preamble comprises a short sequence of known data bits within the satellite navigation data broadcast by the satellites 212 (e.g., the preamble 112 of the GPS navigation message having 8 bits). The known preamble is also referred to herein as the "short preamble." The "extended preamble" comprises a set of expected data bits within the satellite navigation data broadcast by the satellites 212. Referring to FIG. 1, in one embodiment of the invention, the extended preamble may include expected data bits for one or more of the TLM message 114, the reserved bits 116, the parity bits 118, the TOW-count message 120, the alert flag 122, the anti-spoof flag 124, the sub-frame ID 126, and the parity bits 128. A value for the TLM message 114 may be received from the server 208. Values for the reserved bits 116 are known a-priori. The parity bits 118 may be computed in a known-manner given values for the preamble 112 (which is known a-priori), the TLM message 114, and the reserved bits 116. Notably, the parity bits 118 are the Hamming code for the TLM word 106.

The values for the alert flag 122 and the anti-spoof flag 124 may be received from the server 208. A value for the TOW-count message 120 may be obtained from an estimated time-of-day. In one embodiment, an estimated time-of-day may be obtained from the clock circuit 221 in the mobile receiver 202. Alternatively, the estimated time-of-day may be transmitted to the mobile receiver 202 from the server 208. In yet another embodiment, the estimated time-of-day may have been computed as part of a navigation solution performed within either the mobile receiver 202 or the server 208. An exemplary process for computing time-of-day within the navigation solution is described in commonly-assigned U.S. Pat. No. 6,417,801, issued Jul. 9, 2002, which is incorporated by reference herein in its entirety.

In any case, if the time estimate is known to a six second resolution, the expected bits of the TOW-count message 120 may be determined completely. A time estimate having a coarser resolution than six seconds may also be used, but not all of the bits in the 17-bit TOW-count message 120 will be determined. Those skilled in the art will appreciate that the invention may employ other techniques for obtaining an estimated time-of-day that are well-known in the art.

A value for the sub-frame ID 126 may be obtained from the expected value of the TOW-count message 120. Notably, the least significant bit (LSB) of the TOW-count message 120 represents time to six seconds (i.e., the duration of a sub-frame). Thus, the TOW-count message 120 may be viewed as a counter of sub-frames. The modulo-5 value of the TOW-count message 120 for a given sub-frame is the sub-frame index of the next sub-frame. As such, the sub-frame ID 126 is the computed sub-frame index minus one.

Similar to the TLM word 106, values for the parity bits 128 may be determined in a well-known manner given values for the TOW-count message 120, the alert and anti-spoof flags 122 and 124, and the sub-frame ID 126. In this manner, the bit-pattern may comprise expected data bits for both the TLM word and the HOW (i.e., 60 bits).

At optional step 310, a bit-mask may be formed in response to unknown bits of the satellite navigation data. For example, the extended preamble may comprise expected data bits for the TLM word and the HOW. If the mobile receiver 202 does not obtain or compute expected data bits for the entire TLM word and HOW (e.g., 60 bits), then a bit-mask is formed in response to the unknown bits.

At step 312, the navigation data bit-transition data is compared with the bit-pattern to generate match data. Notably, each sequence of data bit-transitions is correlated (i.e., compared) with a sequence of bit-transitions in the bit-pattern at each of a plurality of relative offsets to generate correlation results (i.e., match data). The match data includes a peak corresponding to the relative bit-transition offset that yields the greatest match in accordance with a given metric (e.g., the number of bit-transition matches). In essence, a given sequence of data bit-transitions and the sequence of transitions in the bit-pattern are slid in time relative to one another until the bit-pattern is located. As described below, once the bit-pattern is located (i.e., the relative bit-transition offset yielding the greatest match is determined), the timing of the satellite navigation data may be determined.

For example, a match may be defined with respect to the relative bit-transition offset where the greatest number of bit-transition matches (i.e., the greatest number of absolute matches) occurs. Alternatively, a "contrast ratio" test may be employed. For example, the point of the most matches may be compared to the point having the second most matches (i.e., the "runner-up"). If the difference exceeds a pre-defined threshold, a match may be declared. Otherwise, more measurements may be necessary to establish confidence in the match data.

If multiple satellite signals were received at step 304, then multiple sets of match data may be generated corresponding to the sequence of data bit-transitions estimated from each signal received. In addition, if a bit-mask was formed at step 310, then the navigation data bit-transition data and the bit-pattern are masked in accordance with the bit-mask before being compared to generate the match data.

At step 314, absolute time is determined using the match data generated at step 312. Notably, each data bit-transition in a given sequence is time-stamped using the receiver clock (e.g., clock circuit 221). The match data is analyzed to identify the relative bit-transition offset that results in the greatest match in accordance with a given metric, as described above. The relative bit-transition offset identifies the time at which the GPS receiver 204 received the TOW-count message defined in the bit-pattern in terms of the local clock reference. The TOW-count message defined in the bit-pattern provides the time of transmission from the satellite. The known propagation delay to the satellite can then be used to determine when the signal arrived at the receiver in terms of GPS system time. This actual time of reception is compared to the time of reception according to the local clock to determine the local clock error. The propogation delay to the satellite may be known from the assistance data, or may be estimated from the approximate position of the mobile device 202. If there is no a-priori information, a nominal (e.g., fixed) propagation delay may be used, which typically provides absolute time to within 10 milliseconds. If navigation data bit-transition data was estimated from multiple satellite signals at step 306, then a satellite voting scheme may be employed, as described below with respect to FIG. 7. The process 300 ends at step 316.

The process 300 has been described with respect to navigation data bit-transitions, rather than the actual navigation data bits. Those skilled in the art will appreciate that the process 300 may be performed using sequences of estimated navigation data bits in place of estimated data bit-transitions. However, correlating against bit-transitions, rather than the actual bit values, provides for more robust correlation results in the presence of noise (e.g., bit-errors). Notably, a bit-error in a sequence of estimated data bits will cause each subsequent bit to be inverted from its actual value (e.g., +1 or −1).

If several bit errors are present, the bit-values within the sequence of estimated data bits become corrupted. Thus, it becomes difficult, of not impossible, to match the sequence of bits within the bit-pattern with a corresponding sequence of estimated data bits. Bit-errors, however, do not have the same inversion effect on a sequence of data bit-transitions (e.g., a transition between +1 and −1 is the same as a transition between −1 and +1). Thus, a sequence of data bit-transitions is more immune to errors than is a sequence of data bits.

Figure 4:
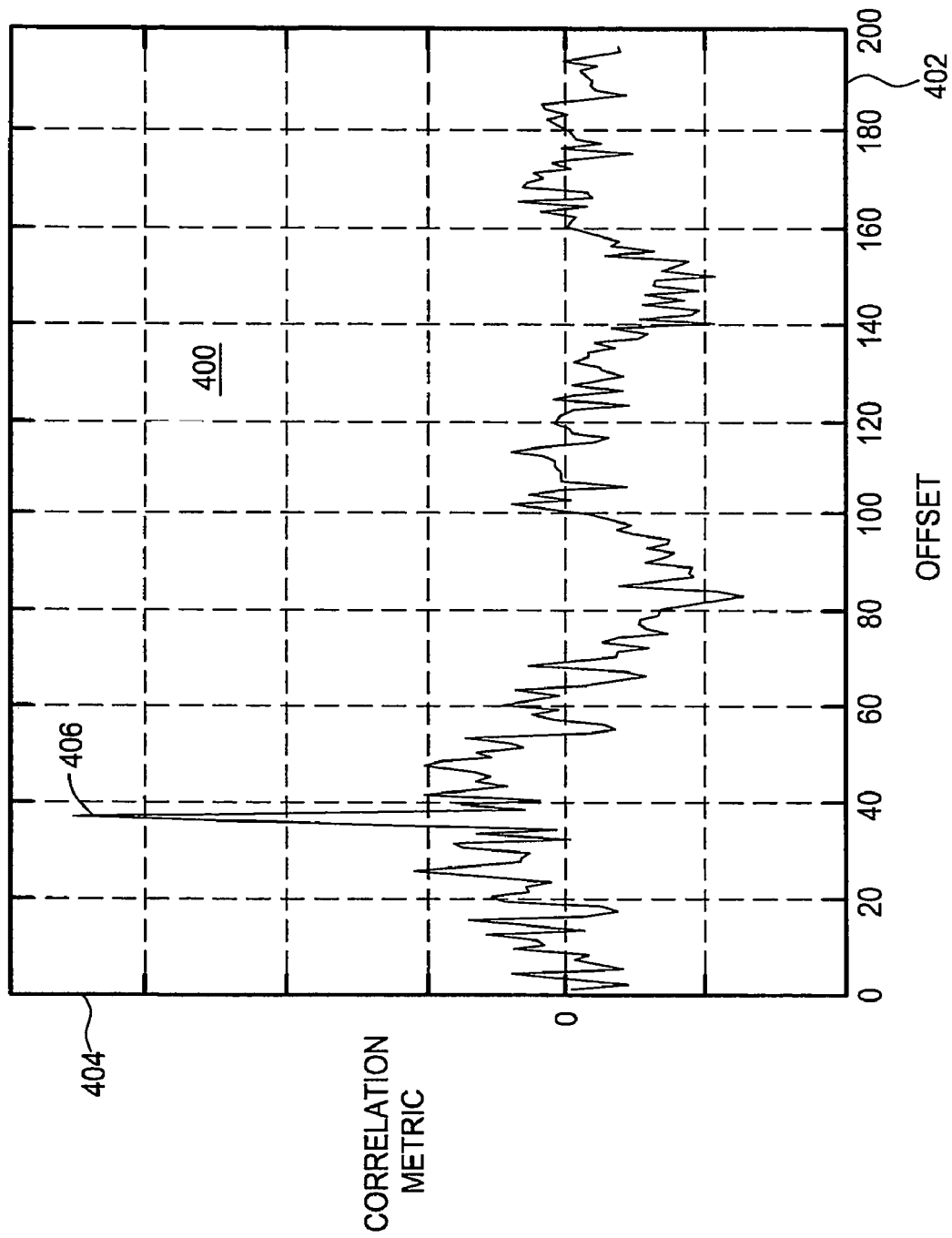
FIG. 4 is a graph illustrating an exemplary correlation response between a sequence of navigation data bit-transitions and a sequence of bit-transitions of an expected bit-pattern.

FIG. 4 is a graph 400 illustrating an exemplary correlation response between a sequence of data bit-transitions and a sequence of bit-transitions of the bit-pattern. The graph 400 includes an axis 402 representing the bit-transition offset, and an axis 404 representing the magnitude of the correlation response ("correlation metric"). For example, the axis 404 may represent the number of bit-transition matches between the two sequences for a given offset. As shown, the graph 400 includes a peak 406 indicating the greatest correlation between the bit-pattern transition sequence and the navigation data bit-transition sequence. The location of the peak along the axis 402 (i.e., the relative bit-transition offset) may be used to determine absolute time, as described above.

Figure 5:
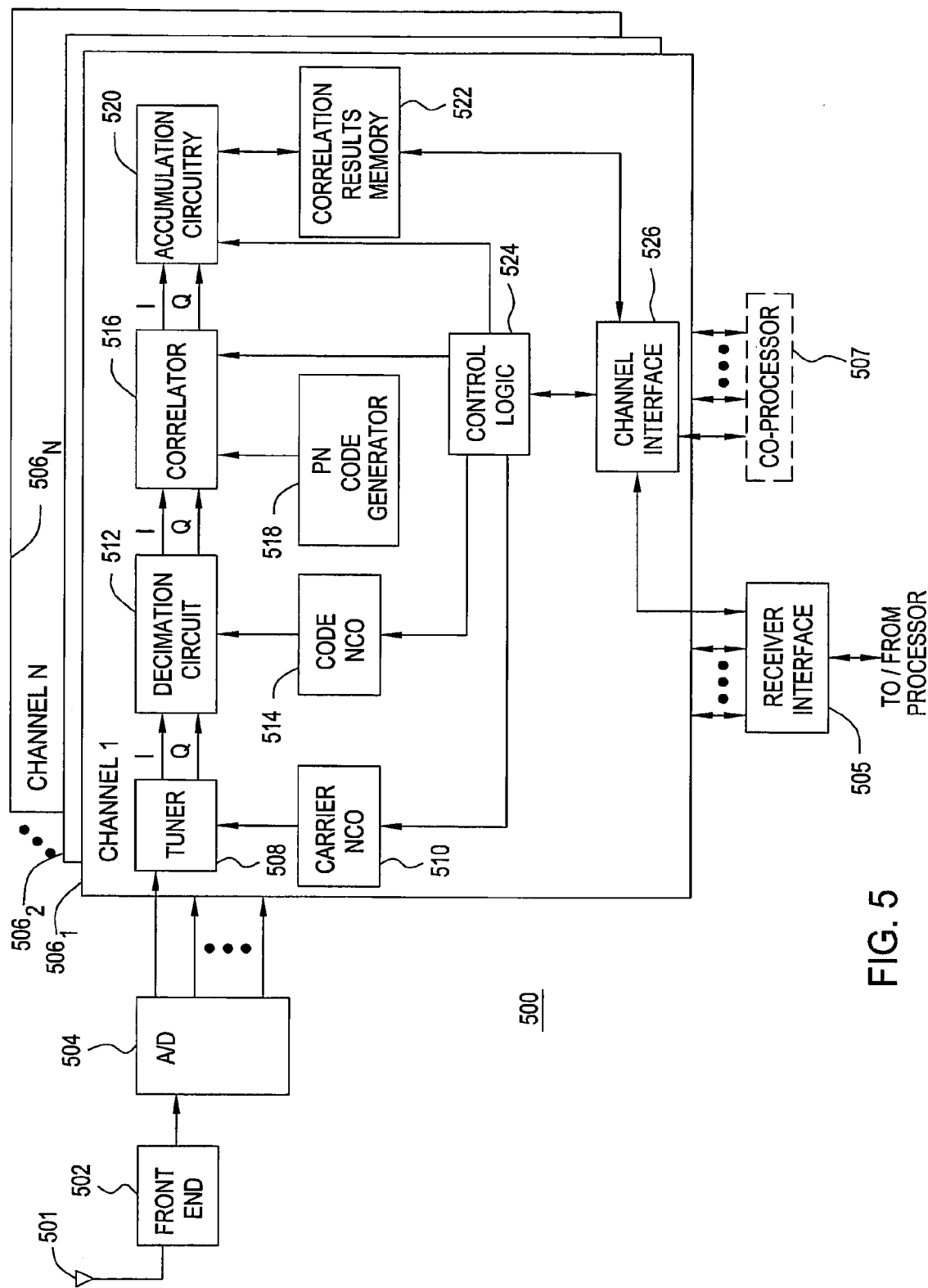
FIG. 5 is a block diagram depicting an exemplary embodiment of a GPS receiver.

FIG. 5 is a block diagram depicting an exemplary embodiment of a GPS receiver 500. The GPS receiver 500 comprises a front end 502, an analog-to-digital converter 504, a receiver interface 505, and a set of processing channels $506_1$ through $506_N$ (collectively referred to as processing channels 506), where N is an integer. In one embodiment, the satellite signal receiver 500 also includes a co-processor 507. For purposes of clarity by example, only the processing channel $506_1$ is shown in detail. Those skilled in the art will appreciate that the processing channels $506_2$ through $506_N$ are identical to the processing channel $506_1$.

GPS signals are received by an antenna 501. The front end 502 filters, amplifies, and frequency shifts the GPS signals in a well-known manner for digitization by the A/D converter 504. Outputs of the A/D converter 504 are respectively coupled to each of the processing channels 506. The receiver interface 505 includes a bus configured to communicate with external circuitry (e.g., a processor), and a bus configured to communicate with each of the processing channels 506. The co-processor 507 includes a bus configured to communicate with the receiver interface 505, and a bus configured to communicate with each of the processing channels 506. If present, the co-processor 507 may be used to perform the time determination process 300 described above.

Each of the processing channels 506 comprises a tuner 508, a carrier numerically controlled oscillator (NCO) 510, a decimation circuit 512, a code NCO 514, a correlator 516, a PN code generator 518, accumulation circuitry 520, correlation results memory 522, control logic 524, and channel interface logic 526. Each of the processing channels 506 may be used to process a signal from a particular satellite. The tuner 508 is driven by the carrier NCO 510 to digitally tune a particular satellite signal. The tuner 508 may server two purposes. First, the tuner 508 may remove any intermediate frequency component remaining after processing by the front end 502. Second, the tuner 508 may compensate for any frequency shift resulting from satellite motion, user motion, and reference frequency errors. The tuner 508 outputs baseband signal data comprises an in-phase component (I) and a quadrature component (Q).

The decimation circuit 512 processes the I and Q data from the tuner 508 to produce a series of complex signal samples with I and Q components in accordance with a sampling rate determined by the code NCO 514. In general, the sampling rate of the decimation circuit 512 may be selected to produce m samples per chip of the satellite signal PN code, where m is an integer greater than zero.

The correlator 516 processes the I and Q samples from the decimation circuit 512. The correlator 516 correlates the I and Q signals with an appropriate PN code generated by the PN code generator 518 for the particular satellite signal. The I and Q correlation results are accumulated with other I and Q correlation results by the accumulation circuitry 520 and are stored in the correlation results memory 522. The accumulation process is referred to as signal integration and is used to improve signal-to-noise ratio of the correlation results.

Notably, the accumulation circuitry 520 may accumulate I and Q correlation results over a time period associated with one or more epochs of the PN code. For example, the I and Q correlation results may be accumulated over a one millisecond interval (i.e., one PN code epoch) or over a multiple millisecond interval (e.g., 20 PN code epochs). This process is referred to as coherent integration and the associated time period is referred to as a coherent integration interval. In general, the correlation results memory 522 stores a sequence of I and Q correlation results captured over a selected time period (e.g., 1 to 10 seconds), where each result may have been integrated over a selected coherent integration interval (e.g., 1 to 10 ms). Since correlation results may be captured over many seconds, the results stored in the correlation results memory 522 may be referred to herein as a "correlation history."

The coherent integration interval is limited by several factors, including uncompensated Doppler shift, 180 degree phase transitions caused by the navigation data bits, and phase shifts induced by motion of the receiver 500. These factors introduce slow, but seemingly random phase variations into the signals. Over many tens of milliseconds, these phase changes cause destructive interference that defeats the purpose of coherent integration.

Note that the correlation results stored in the correlation results memory 522 are not the same as the correlation results produced in the time determination process 300 described above. In particular, the time determination process 300 involves a matching operation between an expected bit-pattern and an estimated sequence of navigation data bits, the results of which may be used to determine absolute time. The correlator 516 performs a correlation between satellite signal samples and a pseudorandom reference code, the results of which may be used to de-spread the satellite signal and estimate the satellite navigation data bits. As such, the correlation results stored in the correlation results memory 522 may be referred to herein as "PN correlation results" or a "PN correlation history."

The carrier NCO 510, the code NCO 514, the correlator 516, and the accumulation circuitry 520 is controlled by the control logic 524. The control logic 524 may receive configuration data for the processing channel $506_1$ from the channel interface 526. The channel interface 526 may receive the configuration data from the receiver interface 505 or from the co-processor 507. In addition, the channel interface 526 provides an interface for the processing channel $506_1$ to the correlation results memory 522. For a detailed understanding of the satellite signal receiver 500 and the components discussed above, the reader is referred to commonly-assigned U.S. patent application Ser. No. 10/690,973, filed Oct. 22, 2003, which is incorporated by reference herein in its entirety.

Figure 6:
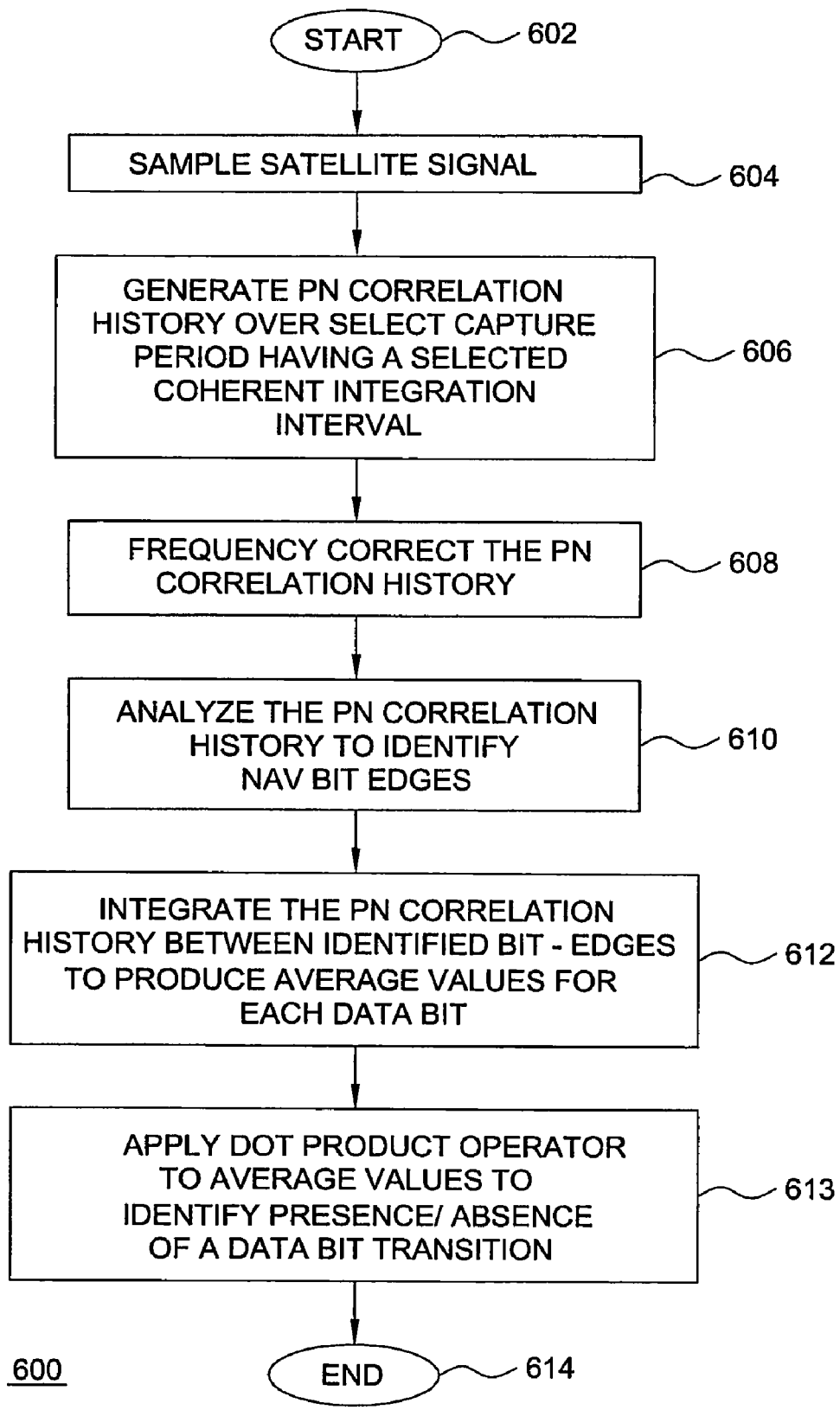
FIG. 6 is a flow diagram depicting an exemplary embodiment of a process for estimating navigation data bit-transitions from a GPS signal.

The sequence of correlation results stored within the correlation results memory 522 may be used to estimate the satellite navigation data bits that phase modulate the PN code of the received satellite signal. Notably, FIG. 6 is a flow diagram depicting an exemplary embodiment of a process 600 for estimating navigation data bit-transitions from a GPS signal. The process 600 may be performed in step 306 of the process 300 shown in FIG. 3 and may be understood with reference to the GPS receiver 500 of FIG. 5.

The process 600 begins at step 602. At step 604, a satellite signal is sampled. At step 606, a PN correlation history is generated over a selected capture period having a selected coherent integration interval. The duration of the capture period may be selected to capture a particular number of navigation data bits. For example, if 256 navigation data bits are desired, I and Q correlation results may be captured for 5.12 seconds (i.e., 256 times 20 ms, the bit duration of a navigation data bit). The duration of the coherent integration interval may be selected in accordance with the size of the memory storing the I and Q correlation results. For example, a coherent integration interval of one millisecond would result in two correlation results per millisecond (i.e., one I-result, and one Q-result). If the correlation history spans 5.12 seconds, then 10,240 results must be stored.

At step 608, the PN correlation history is frequency corrected. For example, phase changes from sample to sample in the PN correlation history may be identified. The frequency (e.g., Doppler frequency due to satellite or mobile receiver motion, oscillator frequency error) may be found by averaging the output of a frequency discrimination algorithm, such as a complex cross-product. The averaging process may comprise straight averaging, weighted averaging, integration, or other combining techniques known in the art. The complex cross-product is defined as $I(n-1)Q(n)-Q(n-1)I(n)$, where n denotes a sample number, I denotes the in-phase value of the sample, Q denotes the quadrature value of the sample.

The frequency analysis of step 608 may be executed several times, since the frequency estimate provided by the complex cross-product operation has a non-linear relationship with the true frequency. After an initial estimate is made, the frequency error may be removed from the PN correlation history. The correlation history is then re-processed and a new frequency value is determined using the complex cross-product operation. By iterating several times, the frequency estimation process will converge.

At step 610, the frequency-corrected PN correlation history is analyzed to identify navigation data bit transitions (i.e., bit edges within the satellite navigation data). In particular, the phase changes from sample to sample of the frequency-corrected PN correlation history are identified to find the 180 degree phase shifts comprising the 50 bps navigation data stream. The 180 degree transitions may be identified by analyzing the phase of the signal before and after the transition. In one embodiment, the bit transitions are found by thresholding the complex dot product. The complex dot-product is defined as $I(n-1)I(n)+Q(n-1)Q(n)$, where n denotes a sample number, I denotes the in-phase value of the sample, Q denotes the quadrature value of the sample. The navigation data bits are detected by the presence or absence of a bit transition. A sign ambiguity may be initially present in the navigation data, which can be resolved by detecting the known preamble sequence in the data.

At step 612, the correlation results of the PN correlation history are integrated between the identified bit transitions to produce average I- and Q-values for each data bit. Integration between bit transitions improves the signal-to-noise ratio, since the phase is determined by analyzing the signal samples over the entire duration of the data bit (i.e., 20 ms). At step 613, a dot product operator is applied to the average I- and Q-values to identify the presence/absence of a data bit-transition. The process 600 ends at step 614. The process 600 may be repeated for each satellite signal received by the GPS receiver.

If the actual data bits are desired, the data bits may be decoded using the identified data bit-transitions. Notably, the first bit is arbitrarily set to a 1 or 0. For each data bit-transition, the value of the bit changes from the proceeding value (i.e., 1 to 0 or 0 to 1). This process provides an ambiguity in the initial bit such that all of the bits may be inverted. Thus, if a sequence of estimated data bits is used in the process 300 of FIG. 3, a negative correlation may also indicate a match. As described above, a sequence of estimated data bits is more susceptible to bit-errors than a sequence of data bit-transitions.

Figure 7:
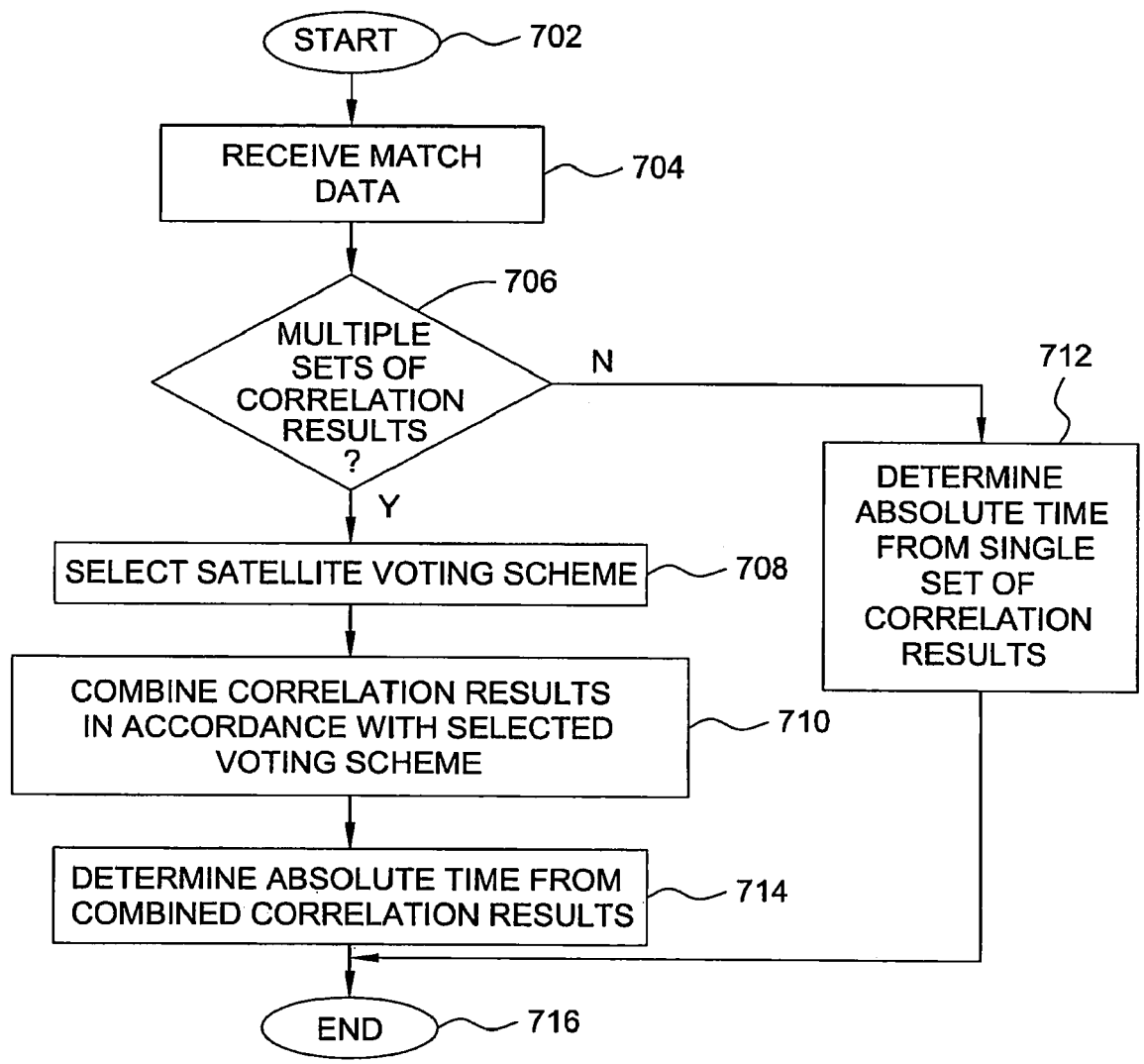
FIG. 7 is a flow diagram depicting an exemplary embodiment of a process for determining absolute time from navigation bit-transition match data.

FIG. 7 is a flow diagram depicting an exemplary embodiment of a process 700 for determining absolute time from match data. The process 700 may be performed in step 314 of the process 300 of FIG. 3 and may be understood with reference to the GPS receiver 500 shown in FIG. 5. The process 700 begins at step 702. At step 704, match data is received. At step 706, a determination is made as to whether the match data includes multiple sets of correlation results (i.e., whether multiple satellite signals were processed to obtain multiple sequences of data bit-transitions). If not, the process 700 proceeds to step 712, where absolute time is determined from a signal set of correlation results, as described above. Otherwise, the process 700 proceeds to step 708.

At step 708, a satellite voting scheme is selected. The satellite voting scheme dictates the weight given to the correlation results collected for each sequence of data bit-transitions, which correspond to different satellite signals. For example, each of the satellite signals may be given equal weight. Alternatively, weaker satellite signals may be given less weight than stronger satellite signals. At step 710, the correlation results for each sequence of data bit-transitions are combined in accordance with the voting scheme. The process 700 proceeds from step 710 to step 714, where absolute time is determined from the combined correlation results, as described above. The process 700 ends at step 716.

While the foregoing is directed to illustrative embodiments of the present invention, other and further embodiments of the invention may be devised without departing from the basic scope thereof, and the scope thereof is determined by the claims that follow.

The invention claimed is:

1. A method of processing satellite positioning system data at a mobile receiver, comprising:
sampling at least one satellite positioning system signal to generate a sequence of digital samples;
correlating said sequence of digital samples with a pseudorandom reference code to generate a sequence of correlation results;
integrating said correlation results over a selected time period according to the bit pattern;
determining a bit-transition in response to said integrated sequence of correlation results; and
generating a bit pattern including a known preamble and an extended preamble, said extended preamble comprising expected data bits within said satellite navigation data.

2. The method of claim 1, further comprising:
relating timing of said satellite navigation data with clock timing of said mobile receiver in response to said correlation results.

3. The method of claim 1, further comprising:
determining a time-of-week value from said satellite navigation data in response to said correlation results.

4. The method of claim 1, wherein generating said bit pattern further comprises:
obtaining a time estimate; and
forming at least a portion of said expected data bits in response to said time estimate.

5. The method of claim 4, wherein forming at least the portion comprises:
creating bits of a time-of-week message using said time estimate.

6. The method of claim 4, wherein said time estimate is obtained from a server in communication with said mobile receiver.

7. The method of claim 4, wherein said time estimate is obtained from a clock disposed within said mobile receiver.

8. The method of claim 4, wherein said time estimate is computed as part of a navigation solution.

9. The method of claim 1, wherein generating comprises:
obtaining information associated with parameters in at least one of a telemetry word and a handover word; and
forming said expected data bits in response to said information.

10. The method of claim 9, wherein at least a portion of said information is received from a server in communication with said mobile receiver.

11. The method of claim 10, wherein said expected data bits include first bits corresponding to parity values and second bits corresponding to an identification value, and wherein said first and second bits are computed in response to said information.

12. The method of claim 9, wherein said information comprises at least one of an estimated time, a telemetry message, an anti-spoof flag, and an alert flag.

13. The method of claim 1, further comprising:
creating a mask in response to unknown bits within said satellite navigation data;
wherein said first bit-transitions and said second bit-transitions are compared using said mask.

14. The method of claim 1, wherein the unknown bits form a portion of telemetry data.

15. The method of claim 1, further comprising:
estimating a frequency error associated with said integrated sequence of correlation results;
and frequency correcting said integrated sequence of correlation results in response to said frequency error.

16. The method of claim 15, further comprising:
identifying phase transitions within said integrated sequence of correlation results;
and re-integrating said correlation results over a second selected time period between said identified phase transitions;
wherein said first bit-transitions are determined in response to said re-integrated correlation results.

17. The method of claim 1, wherein said extended preamble further comprises at least a portion of a Handover Word (HOW).

18. The method of claim 1, wherein said extended preamble further comprises the HOW.

19. The method of claim 1, wherein said extended preamble further comprises a week number.

20. A mobile receiver, comprising:
a satellite signal receiver for detecting satellite navigation data transmitted by at least one satellite; and
a controller for generating a bit pattern including a known preamble and an extended preamble, said extended preamble comprising expected data bits within said satellite navigation data, sampling at least one satellite positioning system signal to generate a sequence of digital samples, correlating said sequence of digital samples with a pseudorandom reference code to generate a sequence of correlation results, integrating said correlation results over a selected time period according to the bit pattern, and determining a bit-transition in response to said integrated sequence of correlation results.

21. The mobile receiver of claim 20, wherein said controller relates timing of said satellite navigation data with clock timing of said mobile receiver in response to said correlation results.

22. The mobile receiver of claim 20, wherein said controller determines a time-of-week value from said satellite navigation data in response to said correlation results.

23. The mobile receiver of claim 20, wherein generating said bit pattern further comprises:
obtaining a time estimate; and
forming at least a portion of said expected data bits in response to said time estimate.

24. The mobile receiver of claim 23, wherein forming at least the portion comprises:
creating bits of a time-of-week message using said time estimate.

25. The mobile receiver of claim 23, wherein said time estimate is obtained from a server in communication with said mobile receiver.

26. The mobile receiver of claim 23, wherein said time estimate is obtained from a clock disposed within said mobile receiver.

27. The mobile receiver of claim 23, wherein said time estimate is computed as part of a navigation solution.

28. The mobile receiver of claim 20, wherein generating comprises:
obtaining information associated with parameters in at least one of a telemetry word and a handover word; and
forming said expected data bits in response to said information.

29. The mobile receiver of claim 28, wherein at least a portion of said information is received from a server in communication with said mobile receiver.

30. The mobile receiver of claim 28, wherein said information comprises at least one of an estimated time, a telemetry message, an anti-spoof flag, and an alert flag.

31. The mobile receiver of claim 30, wherein said expected data bits include first bits corresponding to parity values and second bits corresponding to an identification value, and wherein said first and second bits are computed in response to said information.

32. The mobile receiver of claim 20, wherein said controller creates a mask in response to unknown bits within said satellite navigation data and compares the first bit-transitions and said second bit-transitions using said mask.

33. The mobile receiver of claim 20, wherein the controller estimates a frequency error associated with said integrated sequence of correlation results and frequency corrects said integrated sequence of correlation results in response to said frequency error.

34. The mobile receiver of claim 20, wherein the controller identifies phase transitions within said integrated sequence of correlation results and re-integrates said correlation results over a second selected time period between said identified phase transitions, and wherein said first bit-transitions are determined in response to said re-integrated correlation results.

35. The mobile receiver of claim 20, wherein said extended preamble further comprises at least a portion of a Handover Word (HOW).

36. The mobile receiver of claim 20, wherein said extended preamble further comprises the HOW.

37. The mobile receiver of claim 20, wherein said extended preamble further comprises a week number.

38. The mobile receiver of claim 20, wherein said controller further comprises a processor.

* * * * *